(No Model.)
A. ORME.
SAFETY VALVE.
No. 374,750. Patented Dec. 13, 1887.
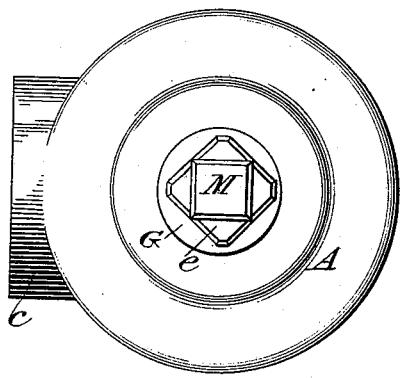
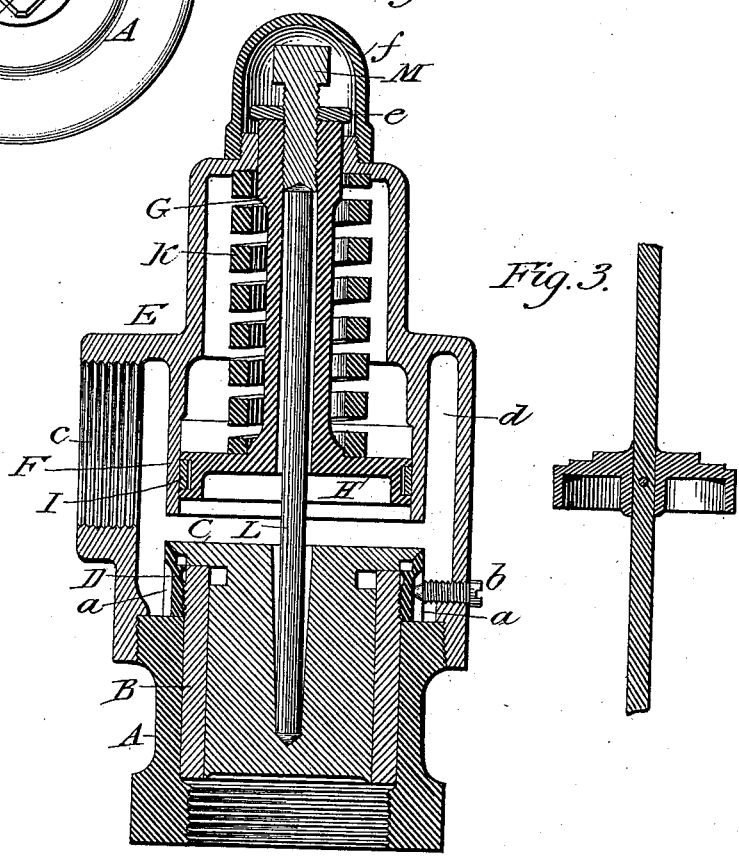
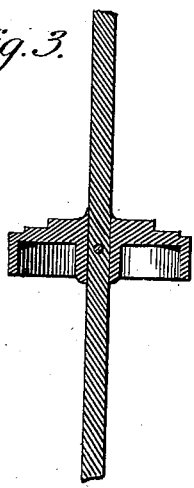
Witnesses.
Geo. D. Mitchell
H. W. Elmore
Inventor:
Alexander Orme,
per J. C. Pennie
Assoc. Atty.

UNITED STATES PATENT OFFICE.

ALEXANDER ORME, OF CHICAGO, ILLINOIS.

SAFETY-VALVE.

SPECIFICATION forming part of Letters Patent No. 374,750, dated December 13, 1887.

Application filed January 17, 1884. Serial No. 117,862. (No model.)

*To all whom it may concern:*

Be it known that I, ALEXANDER ORME, a citizen of the United States, residing in Chicago, county of Cook, and State of Illinois, have invented certain new and useful Improvements in Safety-Valves, of which the following is a specification.

This invention relates to safety-valves in which an adjustable ring works on the valve-seat, and a spindle is employed in connection with a valve held normally upon the seat by and adjusted to varying steam - pressures through the medium of a spring.

The objects of this invention are to effectually isolate the spring from contact with the escaping steam and from an atmosphere or material which might in any manner injure it in substance or modify its normal functions; to decrease the tendency of the spring toward a lateral motion and the friction of its connections with the valve without limiting the power of the spring to automatically adjust itself, so as to exert a positive and uniform pressure throughout the valve, and thereby promote an effective seating of said valve from an elevated position; to equalize, substantially, all of the back-pressure of the steam upon the valve; to make such a connection of the adjusting-screw with the valve and spring that said screw will have no longitudinal movement, and a bearing on the spindle, and exert a direct and positive force upon the valve, and thereby prevent the valve being disturbed by any lateral motion of its spring; to render the ring accessible for adjustment and to be locked from the outside of the valve-case; to provide such an arrangement of the several parts constituting a safety-valve that all of the waste steam from the valve may be conducted before escaping into the open air to some point remote from the valve—as, for example, the smoke-stack of a locomotive or other engine—and thereby deaden the noise of the steam while blowing off, and, finally, to provide certain details of construction, hereinafter described. I attain these objects by devices illustrated in the accompanying drawings, in which—

Figure 1 represents a longitudinal section of a safety-valve embodying my invention; Fig. 2, a top plan view of the same; Fig. 3, a detail section showing another form of the disk forming a seat for and isolating the spring from the waste steam.

Similar letters of reference indicate the same parts in the several figures of the drawings.

A designates a base provided with a bushing, B, forming a seat for the valve C and screw-threaded at its upper end to receive the ring D, which is adjustable thereon with reference to the valve; but instead of this bushing the base and bushing may be formed continuous from a single piece of metal.

Ring D is provided upon its periphery with a series of depressions, *a*, into one of which projects the point of a set-screw, *b*, inserted through the valve-case and operating to lock the ring after it is set to the desired adjustment. The more important object of the depressions *a*, however, is to provide for adjusting the ring from the outside of the case, which adjustment may be effected by means of some suitable implement inserted through the set-screw opening in the case and engaged with depressions to turn the ring in a direction to raise or lower it, as desired, the opening being sufficiently large to permit the implement to have a vibratory movement for that purpose.

Screwed or otherwise rigidly but removably secured to the base is a case, E, provided with a single outlet, *c*, for the discharge of the waste steam, which outlet has preferably extending therefrom a pipe for conducting the steam to some point distant from the valve—as, for example, the smoke-stack of a locomotive or other boiler—and for the purpose of deadening the noise caused by its escape. That portion of the case extending above the plane of the outlet is contracted in diameter and forms a portion of the chamber inclosing the valve-adjusting spring, said chamber being extended downwardly to within a short distance of the valve by a cylindrical shell, F, cast with or otherwise secured to the case, so as to form between it and the case an annular steam-chamber, *d*. This annular chamber not only permits the waste steam to escape at all points around the valve, but by its peculiar form and arrangement with reference to the valve and outlet provides for enough accumulation of steam to exert over the entire upper surface of the valve a uniform back-pressure operating as a useful auxiliary to the spring in promptly and effectively seating the valve the moment enough steam has escaped from a boiler to reduce the pressure to that amount for which the valve is set, this back-pressure of course depending to some extent upon the relative size of the outlet to the annular chamber and the distance to be traveled by the steam before finally escaping into the open air; but in either case the back-pressure will be sufficient to perform the function described with more or less effectiveness and to a marked degree.

Bearing in a circular opening in the upper end of the case is a socket-piece, G, which projects well down toward the lower end of the spring-chamber, and has cast thereon or otherwise secured a disk, H, which, unless ground, will have a slight lateral movement, and in any case is free to reciprocate in the spring-chamber.

When not ground, disk H is provided upon its periphery with an annular groove for holding a metal ring or band, I, sprung or otherwise fitted therein.

Ring I has an outer diameter greater than the disk, so as to fit the steam-chamber closely enough to prevent steam entering the chamber, but without preventing the reciprocation of the disk and ring, and an inner diameter greater than the diameter of the disk when taken from the bottom of the annular groove, so that the disk may have a slight though sufficient lateral movement to take up and equally distribute any unequal pressure of the spring or of the steam and to release itself from any possible friction of the valve-spindle in the socket-piece.

The ring is preferably made of a flexible metal, but may be of any other material adapted to subserve substantially the same purpose.

Supported on the disk, or on an adjacent shoulder formed on the socket-piece, is the valve-adjusting spring K, which bears at its upper end against the end of the case, and by compression is made to hold the valve down until the pressure of steam in the boiler exceeds that for which the valve is set.

In the valve is a socket having a tapering bottom supporting a spindle, L, likewise tapered at both ends, the valve-socket being preferably increased gradually in diameter toward its outer end, so as to avoid friction should the valve by chance oscillate or rock, either when rising or descending.

The spindle projects well up into the socket-piece without contact therewith, and has bearing upon its upper end a set-screw, M, working in the socket-piece, a lock-nut, e, being employed to hold it when set as desired, and a cap, f, screwed on to the case, serving to protect it from being tampered with and to exclude foreign substances.

In its normal position—that is, when seated—the valve affords a solid bearing for the spindle, and as a result the turning of the adjusting-screw to increase the tension of the spring causes the socket-piece to ride upwardly on the screw without the screw having any longitudinal movement, and hence the adjusting-screw requires but a limited space in which to work, and when employed in safety-valves in which there is such a connection between the socket-piece and the valve that the turning of the former will turn the valve to clear it of adhering substances or to lift the valve off its seat independent of the steam this set-screw provides for the convenient attachment of a lever or other device for such purposes.

The only longitudinal movement which the set-screw can have, and this is a very slight one, is when the valve is lifted by the steam and lifts the socket-piece, and as the only other friction to which the valve is subject is that on the ends of the spindle the friction of this valve, as compared with other devices for the same purpose, is materially reduced and the positive action of the valve correspondingly increased, except so far as modified by the employment of the disk, which in valves for particular purposes may be omitted.

In addition to the advantages already set forth of the connections between the spring and valve, it should be stated that the tendency of the valve and of the socket-piece to a lateral movement is materially reduced, which tendency is augmented by reason of the spring having a solid bearing against the case, which is stationary.

Instead of having a socket-piece in connection with the disk, the disk may be rigidly secured to a spindle and support the spring, as indicated in Fig. 3, when it is desirable to employ the disk in a spring-inclosing chamber in a safety-valve in which the tension of the spring is adjusted by a cross-head or other device which moves down upon the spring, without departing from the spirit of my invention, so far as it relates to inclosing the spring in a chamber which will exclude steam. In such a construction, however, it is suggested that the case be made in two parts and telescoped, so as to permit a free action of the spring and insure the steam-tight chamber therefor.

In the operation of my device, when constructed as shown in Fig. 1, the steam escaping from the valve accumulates in the space between the valve and the disk, and any pressure which it exerts between those two points is neutralized, for the reason that the same force it exerts upon the valve is also exerted against the spring through the disk, and hence it is only when the pressure of steam in the boiler is less than the force of the spring that the back-pressure of the steam in the annular chamber causes the valve to seat itself, and this it does instantly.

All of the steam which could exert a back-pressure on the valve is neutralized in this respect, and it therefore makes no difference how much the back-pressure of steam may be in the annular chamber and the escape-pipe the result will be precisely the same, only that the greater the back-pressure the quicker will the valve seat itself, and thereby diminish the escape of steam from the boiler beyond the pressure for which the valve was set.

In the ordinary employment of safety-valves the spring is not inclosed, and therefore is frequently injured by foreign substances escaping with the steam, by rust, dirt, &c., and are totally unfitted for use upon vessels running upon salt-water, which is very injurious to the spring; but by the employment of a valve case and disk these objections are entirely avoided, while by means of the disk I am at the same time enabled to neutralize the back-pressure of steam upon the valve.

The purposes of the adjustable collar need not here be set forth, for the reason that the said collar forms the subject-matter of patents already granted me.

In conclusion it may be stated that the several parts of my device—as, for example, the disk, or the means for adjusting the spring, or for adjusting and locking the collar—may be used the one independent of the other, and in safety-valves of an otherwise entirely different construction without a departure from the invention herein involved, and without limiting to their precise construction elements designated by general terms in the claims.

Having described my invention, what I claim, and desire to secure by Letters Patent, is—

1. The combination, with the valve-adjusting spring and a chamber rigidly secured at one end to the case and surrounding the valve, of a disk independent of but connected with said valve and closing one end of said chamber against the ingress of the escaping steam, substantially as described.

2. The combination, with the valve, of a disk or plate suspended or supported above the valve, said disk being flexibly connected with the valve and adapted to equalize the entire back-pressure of the steam on the valve, substantially as described.

3. The spring-chamber and the spring bearing at its upper end against a rigid support, in combination with a socket-piece having a lateral bearing near its upper end in the rigid support of the spring-chamber, and means for maintaining said socket-piece in its bearing and in an elevated position above the valve, substantially as described.

4. The combination, with the valve, the valve-spindle, and the adjusting-spring, of a socket-piece and an adjusting-screw working in said socket-piece and bearing against the spindle, substantially as described.

5. The combination, with the spring, the inclosing-chamber thereof, and the socket-piece, of a disk working in said chamber and provided with a circumferential groove, and a packing-ring working in said groove, substantially as described.

ALEXANDER ORME.

Witnesses:
  JNO. G. ELLIOTT,
  JNO. M. GIBSON.